United States Patent
Hirano

(10) Patent No.: US 10,969,818 B1
(45) Date of Patent: Apr. 6, 2021

(54) ROTATIONAL RESISTANCE APPARATUS AND OPERATION APPARATUS

(71) Applicant: CANON KABUSHIKI KAISHA, Tokyo (JP)

(72) Inventor: Junya Hirano, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/021,151

(22) Filed: Sep. 15, 2020

(30) Foreign Application Priority Data

Sep. 27, 2019 (JP) .............................. JP2019-176362

(51) Int. Cl.
| | |
|---|---|
| G05G 5/03 | (2008.04) |
| F16D 57/00 | (2006.01) |
| G05G 1/10 | (2006.01) |
| G02B 7/04 | (2021.01) |
| G02B 7/16 | (2021.01) |

(52) U.S. Cl.
CPC ............. *G05G 5/03* (2013.01); *F16D 57/002* (2013.01); *G05G 1/10* (2013.01); *G02B 7/04* (2013.01); *G02B 7/16* (2013.01); *G05G 2505/00* (2013.01)

(58) Field of Classification Search
CPC ...... F16D 57/002; G02B 7/16; G05G 2505/00
See application file for complete search history.

(56) References Cited

U.S. PATENT DOCUMENTS

| 8,378,858 B2* | 2/2013 | Sadamori | ............... H03K 17/97 341/35 |
| 8,857,591 B2* | 10/2014 | Seipel | ..................... F16D 37/02 192/56.33 |
| 10,738,854 B2 | 8/2020 | Takahashi | |
| 2009/0096641 A1* | 4/2009 | Inoue | ....................... G05G 5/03 341/35 |

FOREIGN PATENT DOCUMENTS

| JP | 2011156171 A | 8/2011 |
| JP | 2017089732 A | 5/2017 |
| JP | 2017110756 A | 6/2017 |
| WO | 2017145857 A1 | 8/2017 |

\* cited by examiner

*Primary Examiner* — Vicky A Johnson
(74) *Attorney, Agent, or Firm* — Rossi, Kimms & McDowell LLP

(57) ABSTRACT

A rotational resistance apparatus includes a shaft member that includes a first shaft and a second shaft having a diameter larger than a diameter of the first shaft and that has magnetism, a bobbin that is arranged on an outer periphery of the first shaft and that does not have magnetism, a coil that is wound around the bobbin, a case member having magnetism that covers the bobbin, the coil, and the second shaft, a slide bearing that rotatably receives the first shaft through a first gap and that does not have magnetism, and a magnetic viscous fluid that is arranged between the second shaft and the case member. The first gap is smaller than a second gap between the case member and the first shaft.

9 Claims, 5 Drawing Sheets

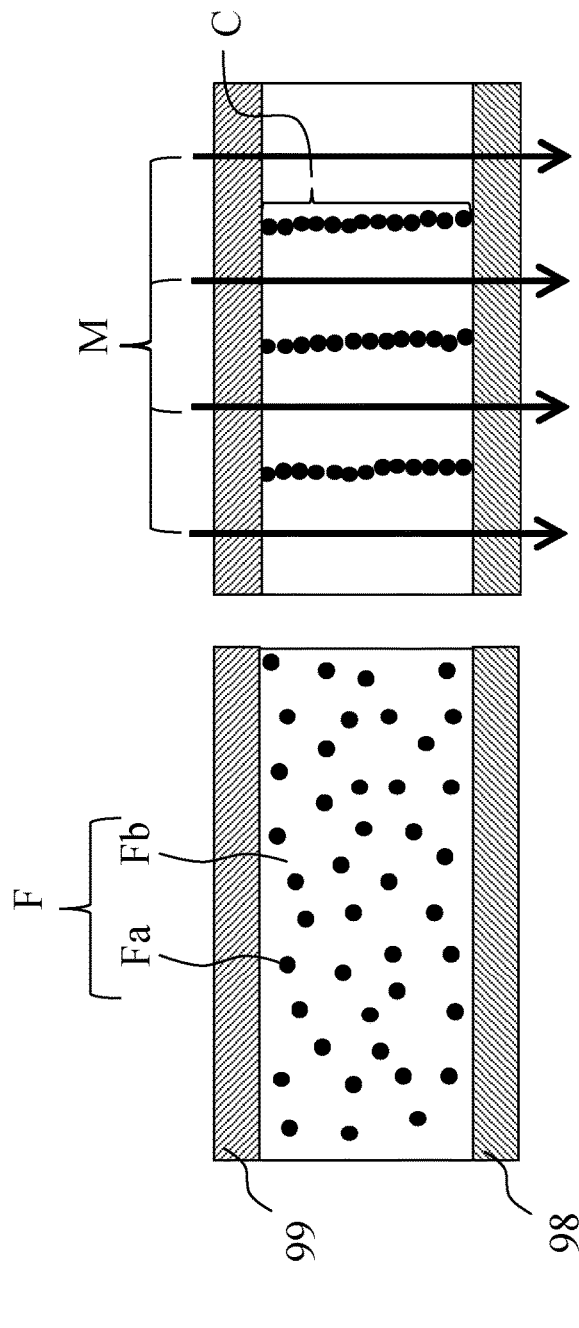
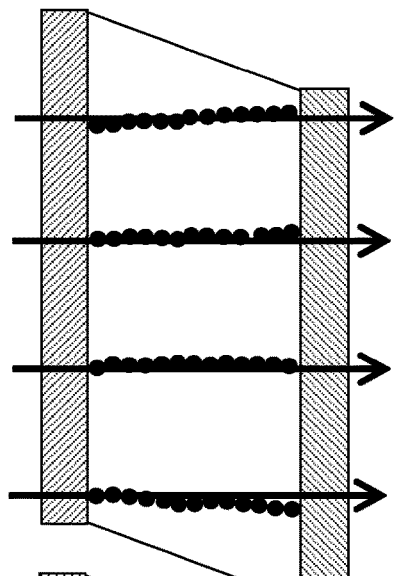
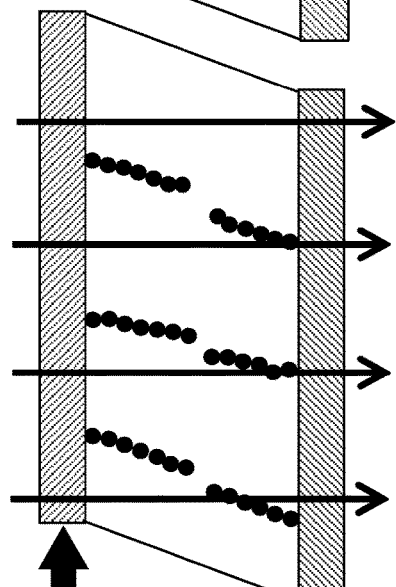
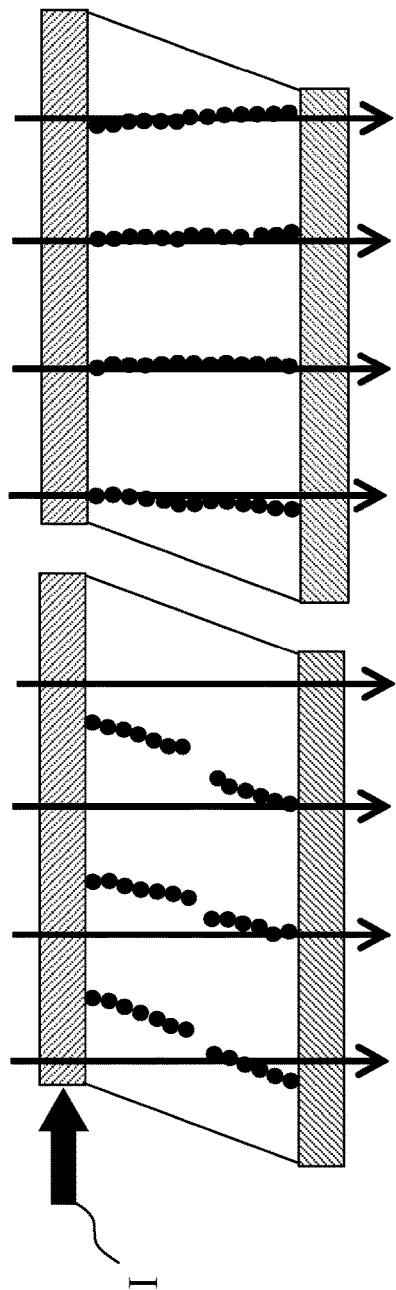
FIG. 3A
FIG. 3B
FIG. 3C
FIG. 3D

US 10,969,818 B1

ROTATIONAL RESISTANCE APPARATUS AND OPERATION APPARATUS

BACKGROUND OF THE INVENTION

Field of the Invention

The present invention relates to a rotational resistance apparatus and an operation apparatus.

Description of the Related Art

A rotational resistance apparatus that generates resistance to a rotation operation using a magnetic viscous fluid can present, for example, resistance to rotation of an operation member capable of a rotation operation to an operator as an operational feeling (touch sensation). Japanese Patent Laid-Japanese Open No. ("JP") 2017-89732 and Japanese Patent Laid-Open No. ("JP") 2017-110756 disclose a rotational resistance apparatus adjusting a magnetic field that is applied to a rotatable rotor and a magnetic viscous fluid arranged around a shaft member to adjust resistance (resistance torque) for shearing the magnetic viscous fluid.

However, the rotational resistance apparatus disclosed in JP 2017-89732 and JP 2017-110756 maintains a gap where the magnetic viscous fluid is arranged by supporting the rotor and the shaft member using a ball bearing, and thus increases in a radial direction. Additionally, since components for use the rotor as part of a magnetic circuit, the coil, and the magnetic viscous fluid are accumulated in the radial direction, the rotational resistance apparatus of JP 2017-89732 is not suitable for reducing a diameter. Further, since the magnetic viscous fluid is arranged on an inner diameter side of the apparatus, the rotational resistance apparatus of JP 2017-110756 cannot generate the resistance torque efficiently.

SUMMARY OF THE INVENTION

The present invention provides a rotational resistance apparatus advantageous in, for example, generation efficiency of rotation resistance and small size.

A rotational resistance apparatus according to one aspect of the present invention includes a shaft member that includes a first shaft and a second shaft having a diameter larger than a diameter of the first shaft and that has magnetism, a bobbin that is arranged on an outer periphery of the first shaft and that does not have magnetism, a coil that is wound around the bobbin, a case member having magnetism that covers the bobbin, the coil, and the second shaft, a slide bearing that rotatably receives the first shaft through a first gap and that does not have magnetism, and a magnetic viscous fluid that is arranged between the second shaft and the case member. The first gap is smaller than a second gap between the case member and the first shaft.

An operation apparatus as another aspect of the present invention includes an operation member that is rotatable, and a rotational resistance apparatus that applies resistance force to the operation member The rotational resistance apparatus includes a shaft member that includes a first shaft and a second shaft having a diameter larger than a diameter of the first shaft and that has magnetism, a bobbin that is arranged on an outer periphery of the first shaft and that does not have magnetism, a coil that is wound around the bobbin, a case member having magnetism that covers the bobbin, the coil, and the second shaft, a slide bearing that rotatably receives the first shaft through a first gap and that does not have magnetism, and a magnetic viscous fluid that is arranged between the second shaft and the case member. The first gap is smaller than a second gap between the case member and the first shaft.

Further features of the present invention will become apparent from the following description of exemplary embodiments with reference to the attached drawings.

BRIEF DESCRIPTION OF THE DRAWINGS

FIGS. 3A to 3D are diagrams illustrating a principle of generation of resistance force of MR fluid in Example 1.

DESCRIPTION OF THE EMBODIMENTS

Referring now to the accompanying drawings, a detailed description will be given of examples according to the present invention.

Example 1

Figure 1:
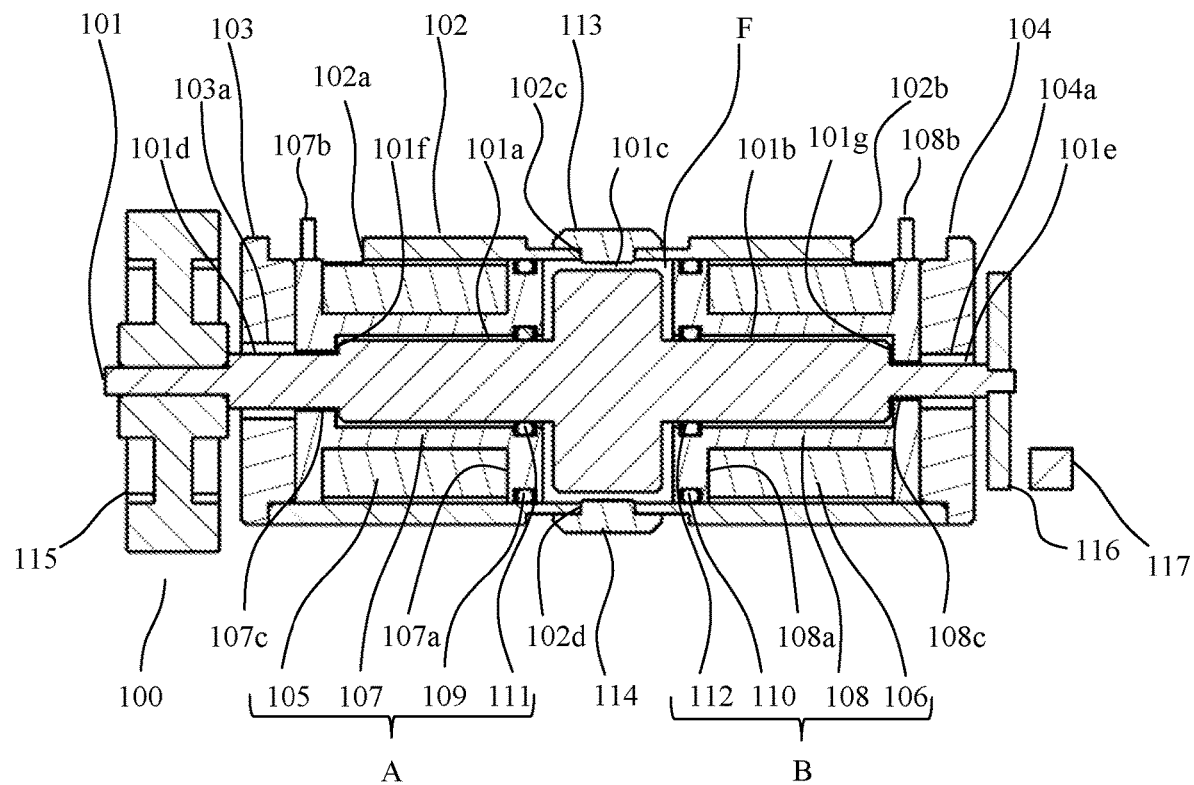
FIG. 1 is a sectional view illustrating a configuration of a rotational resistance apparatus according to Example 1 of the present invention.
Figure 2:
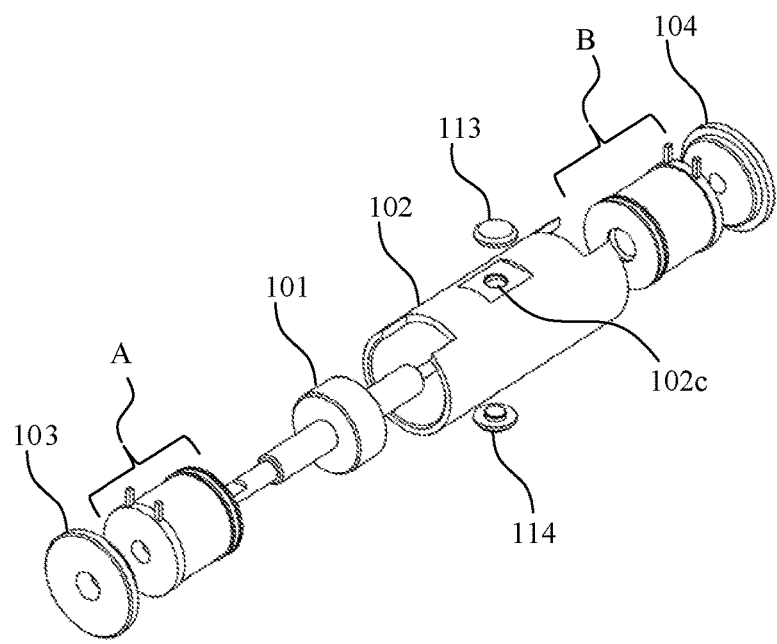
FIG. 2 is an exploded perspective view of the rotational resistance apparatus according to Example 1.
Figure 4:
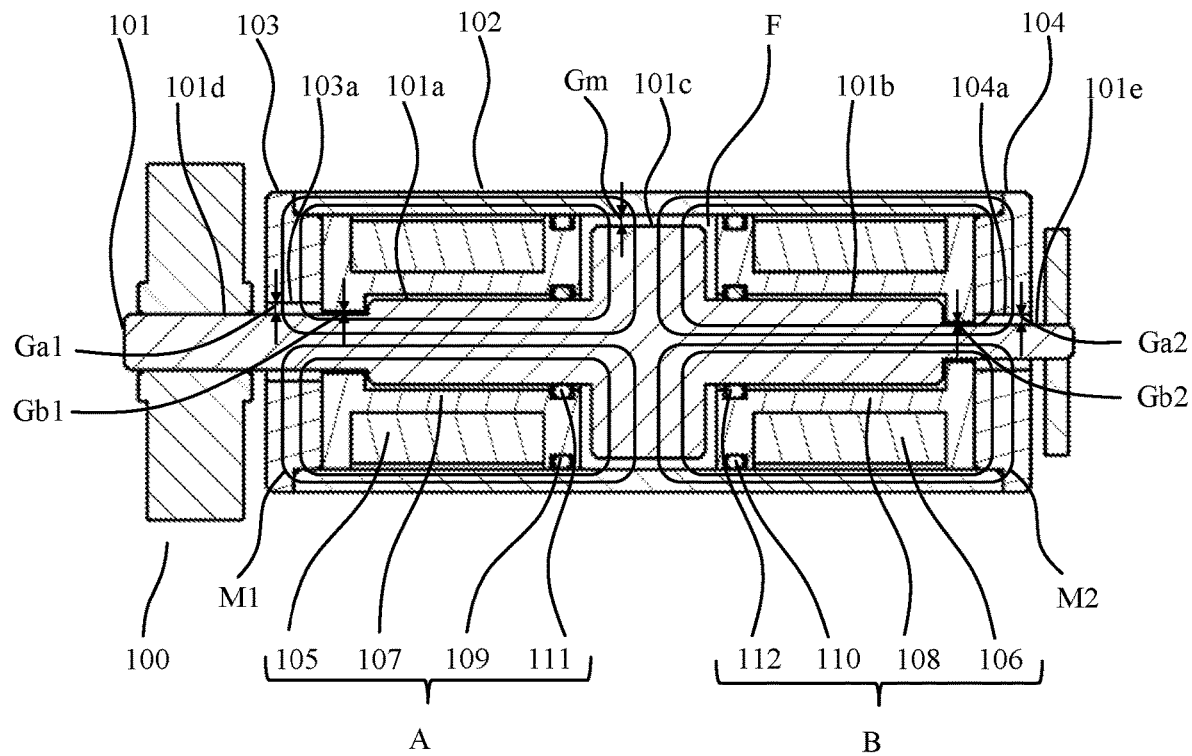
FIG. 4 is a sectional view illustrating a magnetic circuit in the rotational resistance apparatus according to Example 1.

FIGS. 1, 2, and 4 illustrate a configuration of a rotational resistance apparatus 100 according to Example 1 of the present invention. The rotational resistance apparatus 100 includes a shaft member 101 that is rotatable, a cylindrical member 102 that is arranged to surround a outer periphery of the shaft member 101, and first and second circular plates 103, 104 that are provided to close openings at both ends of the cylindrical member 102. The cylindrical member 102 and the first and second circular plate 103, 104 form a case member.

The cylindrical member 102 is formed as a magnetic material, and has cutout parts 102a, 102b and through hole parts 102c, 102d. The first and second circular plate 103, 104 are formed as a magnetic material and have through hole parts 103a, 104a, respectively.

The shaft member 101 is formed as a magnetic material, and has first shafts 101a, 101b that are provided at both ends of the shaft member 101 in a shaft direction and a second shaft 101c that is provided between the first shafts 101a, 101b and that has a diameter larger than a diameter of the first shafts 101a, 101b. In the following description, the shaft direction of the shaft member 101 is used as a shaft direction of the rotational resistance apparatus 100, and a direction perpendicular to the shaft direction is referred to as a radial direction.

The first shaft 101a has a transmission shaft part 101d, in which a diameter is reduced by forming a step 101f, on a tip side (a side opposite to the second shaft 101c) in the shaft direction. On the other hand, the first shaft 101b has a detection shaft part 101e, in which a diameter is reduced by forming a step 101g, on a tip side in the shaft direction.

On an outer periphery of the first shafts 101a, 101b provided inside the cylindrical member 102, coils 105, 106 that are respectively wound around bobbins 107, 108 are arranged. The cylindrical member 102 is arranged to cover an outer periphery of the coils 105, 106 and an outer periphery of the second shaft 101c. The first and second circular plates 103, 104 are arranged to cover ends of outside (a side far from the second shaft 101c) of the bobbins 107, 108 in the shaft direction.

The transmission shaft part 101d and the detection shaft part 101e of the shaft member 101 project to an outside of the case member through the through hole parts 103a, 104a of the first and second circular plates 103, 104, respectively. As illustrated in FIG. 4, a gap (second gap) Ga1 is provided between an inner circumferential surface of the through hole part 103a and an outer circumferential surface of the transmission shaft part 101d. A gap (second gap) Ga2 is also provided between an inner circumferential surface of the through hole part 104a and an outer circumferential surface of the detection shaft part 101e.

A gear 115 is fixed to the tip of the first shaft 101a to rotate integrally with the shaft member 101, and a detected member 116 for rotation (angle) detection is fixed to the tip of the first shaft 101b to rotate integrally with the shaft member 101. A detector 117 is arranged to face a side surface of the detected member 116.

The gear 115 can transmit rotation resistance torque generated by the rotational resistance apparatus 100 on the basis of a principle described later to a rotation operation member (not illustrated). The detector 117 optically or magnetically detects a pattern (not illustrated) provided on the detected member 116 and outputs a signal. The rotation angle of the rotation operation member can be detected using the signal.

Both bobbins 107, 108 are formed as non-magnetic materials. Each of the bobbins 107, 108 has, on both sides in the shaft direction, annular end surface parts 107a, 108a that abut on an inner circumferential surface of the cylindrical member 102. Additionally, the bobbins 107, 108 are respectively provided with wiring parts 107b, 108b for connecting the windings of the coils 105, 106 to an external magnetic field control apparatus (not illustrated).

Further, slide bearings 107c, 108c that rotatably receives the first shaft 101a (transmission shaft part 101d) and the first shaft 101b (detection shaft part 101e) are formed on an inner periphery of the end surface parts 107a, 108a provided outside of the bobbins 107, 108 in the shaft direction, respectively. As illustrated in FIG. 4, between inner circumferential surfaces of the slide bearings 107c, 108c and outer circumferential surfaces of the first shafts 101a, 101b, gaps (first gap) Gb1, Gb2 are formed. Side parts (internal surfaces of the end surface parts 107a, 108a of the bobbins 107, 108) of the slide bearings 107c, 108c respectively abut on the steps 101f, 101g of the shaft member 101 to limit displacement in the shaft direction of the shaft member 101.

A magnetic viscous fluid (hereinafter referred to as MR fluid) F is arranged in a gap area that is surrounded by an outer circumferential surface and both side surfaces of the second shaft 101c, the inner circumferential surface of the cylindrical member 102, and the end surface parts 107a, 107b inside (a side near the second shaft 101c) of the bobbins 107a, 108a. As illustrated in FIG. 4, the gap area includes a gap (third gap) Gm provided between the outer circumferential surface of the second shaft 101c and the inner circumferential surface of the cylindrical member 102. The MR fluid F is filled in the gap area from one of the through hole parts 102c, 102d of the cylindrical member 102, and then the through hole parts 102c, 102d are sealed by sealing members 113, 114.

In annular concave parts provided on outer circumferential surfaces of the end surface parts 107a, 108a inside of the bobbins 107, 108 in the shaft direction, first seal rings 109, 110 to seal a gap between the outer circumferential surfaces of the end surface parts 107a, 108a and the inner circumferential surface of the cylindrical member 102 are fitted and retained. Further, in annular concave parts provided on inner circumferential surfaces of the end surface parts 107a, 108a inside of the bobbins 107, 108 in the shaft direction, second seal rings 111, 112 to seal a gap between the inner circumferential surfaces of the end surface parts 107a, 108a and the inner circumferential surfaces of the first shafts 101a, 101b are fitted and retained.

The rotational resistance apparatus 100 is assembled as follows. As illustrated in FIG. 2, the shaft member 101 and a coil unit A (the bobbin 107, the coil 105, and the first and second seal rings 109, 111) are inserted in this order from one side in the shaft direction inside the cylindrical member 102, and a coil unit B (the bobbin 108, the coil 106, and the first and second seal rings 110, 112) is inserted from the other side in the shaft direction inside the cylindrical member 102. Then, the first circular plate 103 is fitted in one opening end in the shaft direction of the cylindrical member 102, and the second circular plate 104 is fitted in the other opening end in the shaft direction. Then, as described above, the MR fluid F is filled from one of the through hole parts 102c, 102d of the cylindrical member 102, and the through hole parts 102c, 102d are sealed by the sealing members 113, 114.

In the rotational resistance apparatus 100 configured as above, a size in the radial direction of the gap Gb1 between the inner circumferential surface of the slide bearing 107c and the outer circumferential surface of the transmission shaft part 101d is smaller (that is, narrower) than that of the gap Ga1 between the inner circumferential surface of the through hole part 103a and the outer circumferential surface of the transmission shaft part 101d. Additionally, the gap Gb2 between the inner circumferential surface of the slide bearing 108c and the outer circumferential surface of the detection shaft part 101e is narrower than the gap Ga2 between the inner circumferential surface of the through hole part 104a and the outer circumferential surface of the detection shaft part 101e. Further, the gaps Gb1, Gb2 is narrower than the gap (third gap) GM between the outer circumferential surface of the second shaft 101c and the outer circumferential surface of the cylindrical member 102 in a space where the MR fluid F is arranged.

Referring now to FIGS. 3A to 3D, a description will be given of a principle that the MR fluid F generates resistance force against shear. The MR fluid F has a reversible property in which the resistance force against shear increases when a magnetic field M is applied and returns to the original resistance force when the magnetic field is removed. As illustrated in FIG. 3A, in a state where the magnetic field M is not applied, the MR fluid F is a liquid where numberless magnetic material particles Fa are dispersed in a solvent Fb. As illustrated in FIG. 3B, when the magnetic field M is applied in this state, numberless clusters C, which is aggregate of the magnetic material particles Fa, is formed along a direction of the magnetic field. The cluster C is formed by attracting numberless magnetic material particles Fa magnetized by the magnetic field M to the nearby magnetic material particles Fa.

As illustrated in FIG. 3C, when a movable part 99 (second shaft 101c), which is movable relative to a fixing part 98 (cylindrical member 102), receives external force I in a direction perpendicular to the magnetic field M, each cluster C gradually extends while tilting, and is eventually cut. Until the cluster C is cut, attraction force to attract the magnetic material particles Fa forming the cluster C to each other becomes resistance force. As illustrated in FIG. 3D, each cluster C, which is cut, combines with another cluster C. By repeatedly cutting and combining each cluster C in this way, the resistance force against shear of the fixed part 98 and the movable part 99 is maintained. By increasing the strength of the magnetic field M, the attraction force between the magnetic material particles Fa inside each cluster C becomes stronger, and the generated resistance force also becomes larger.

FIG. 4 illustrates a magnetic circuit in the rotational resistance apparatus 100 according to this example. The magnetic fluxes have a property of repelling each other and a property of forming a closed loop magnetic circuit having neither a starting point nor an ending point. In the rotational resistance apparatus 100 according to this example, currents flow from the magnetic field control apparatus to the coils 105, 106 so that magnetic fluxes in opposite directions flow in the first shafts 101a, 101b. FIG. 4 illustrates a first magnetic circuit M1 in which a magnetic flux generated by energizing the coil 105 flows and a second magnetic circuit M2 in which a magnetic flux generated by energizing the coil 106 flows using a closed loop curve.

The magnetic fluxes that flow from each of the first shafts 101a, 101b of the shaft member 101 to the second shaft 101c repels in the second shaft 101c and flow toward the outer circumferential surface of the second shaft 101c. The magnetic fluxes flowing through from the outer circumferential surface of the second shaft 101c pass through the MR fluid F and flow in the cylindrical member 102. The magnetic fluxes generated by energizing the coil 105 of the magnetic fluxes which flow in the cylindrical member 102 flow in part facing the coil 105 of the cylindrical member 102 and flow toward the first circular plate 103. Then, the magnetic fluxes flowing out the first circular plate 103 returns to the first shaft 101a through the transmission shaft part 101d, which faces the through hole part 103a in a non-contact manner. On the other hand, the magnetic fluxes generated by energizing the coil 106 of the magnetic fluxes which flow in the cylindrical member 102 flow in part facing the coil 106 of the cylindrical member 102 and flow toward the second circular plate 104. Then, the magnetic fluxes flowing through the second circular plate 104 returns to the first shaft 101b through the detection shaft part 101e, which faces the through hole part 104a in a non-contact manner.

In this example, since almost all of the magnetic fluxes generated by energizing the coils 105, 106 flow in the MR fluid F through the first and second magnetic circuits M1, M2 to form numberless clusters C in the MR fluid F, the resistance force (rotation resistance torque) against the rotation of the shaft member 101 can be efficiently generated. Then, changing the amount of current flowing in the coils 105, 106 can control the strength of the magnetic fluxes flowing in the MR fluid F to adjust the magnitude of the rotation resistance torque.

Further, as described above, since the gaps Gb1, Gb2 are narrower than the gaps Ga1, Ga2, Gm, the shaft member 101 is rotatably supported in a non-contact state with the case member (the cylindrical member 102, the first and second circular plates 103, 104). As a result, the gaps Ga1, Ga2, Gm are always kept constant, and stable rotation resistance torque can be generated by contacting the shaft member 101 with the case member without making the magnetic resistance of the first and second magnetic circuits M1, M2 unstable and changing the magnetic fluxes flowing in the MR fluid F.

In this example, since the slide bearings 107c, 108c are formed integrally with the bobbins 107, 108, the number of parts of the rotational resistance apparatus 100 is smaller than that in the case where these are separate parts, so that the configuration and the assembly can be simplified. Further, since the number of parts is reduced, the tolerances are less accumulated, and the gap (Ga1, Ga2, Gm) in each magnetic circuit can be reduced. As a result, the magnetic resistance of each magnetic circuit can be reduced, and larger rotation resistance torque can be obtained.

Further, since the slide bearings 107c, 108c function as a thrust bearing that sandwiches the steps 101f, 101g of the shaft member 101, it is possible to further simplify the configuration and the assembly.

Example 2

Figure 5:
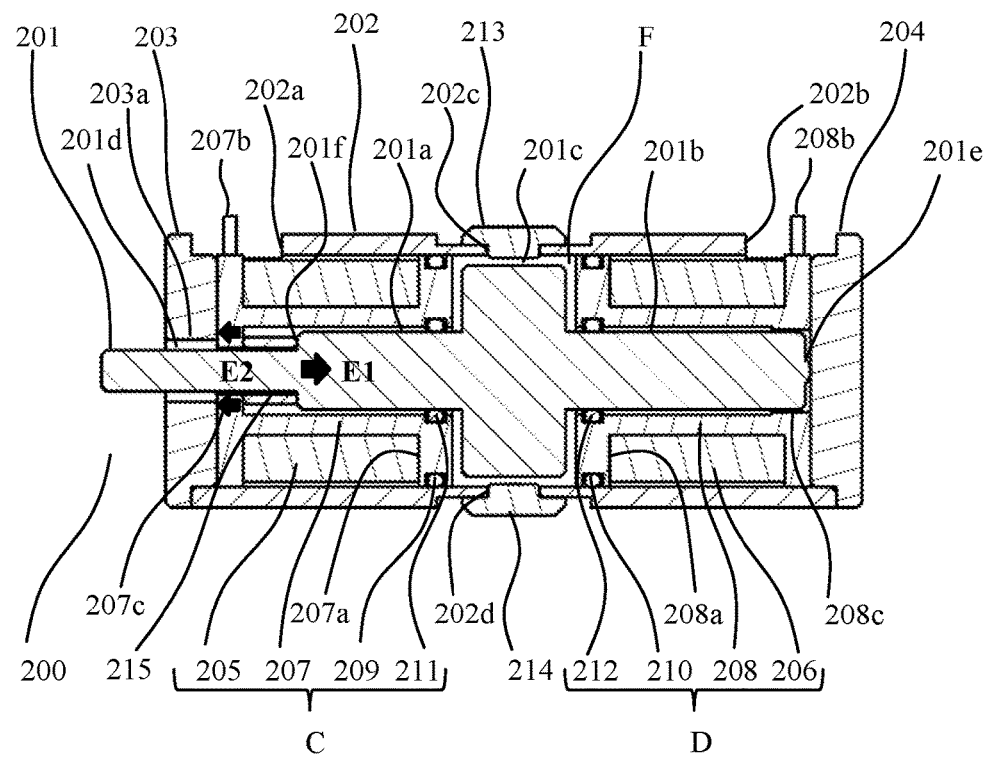
FIG. 5 is a sectional view illustrating a configuration of a rotational resistance apparatus according to Example 2 of the present invention.

FIG. 5 illustrates a configuration of a rotational resistance apparatus 200 according to Example 2 of the present invention. In this example, components common to or similar to those in Example 1 are given reference numerals with the first digit 1 of the reference numeral in Example 1 changed to 2, and the digits thereafter are the same. Further, coil units C, D respectively correspond to the coil units A, B in Example 1. Below, differences from the rotational resistance apparatus 100 according to Example 1 are explained.

The rotational resistance apparatus 200 according to this example includes a coil spring 215 that is arranged between a step 201f on an outer periphery of a first shaft 201a of a shaft member 201 and an internal surface of an end surface part 207a of a bobbin 207 and that biases the shaft member 201 on one side (a side of a first shaft 201b) in a shaft direction as a biasing member. A second circular plate 204 does not have a through hole part corresponding to the through hole part 104a of the second circular plate 104 according to Example 1, and a hemispherical convex part 201e at a tip of the first shaft 201b is pressed against the second circular plate 204 by the biasing force E1 of the coil spring 215. The second circular plate 204 is fixed to a cylindrical member 202 to withstand the biasing force E1. The first shaft 201b is not provided with a detection shaft part corresponding to the detection shaft part 101e according to Example 1.

Further, reaction force E2 against the biasing force E1 acts on the bobbin 207 on which the coil spring 215 abuts. A first circular plate 203 that abuts on the bobbin 207 is fixed to the cylindrical member 202 to withstand the reaction force E2.

Figure 6:
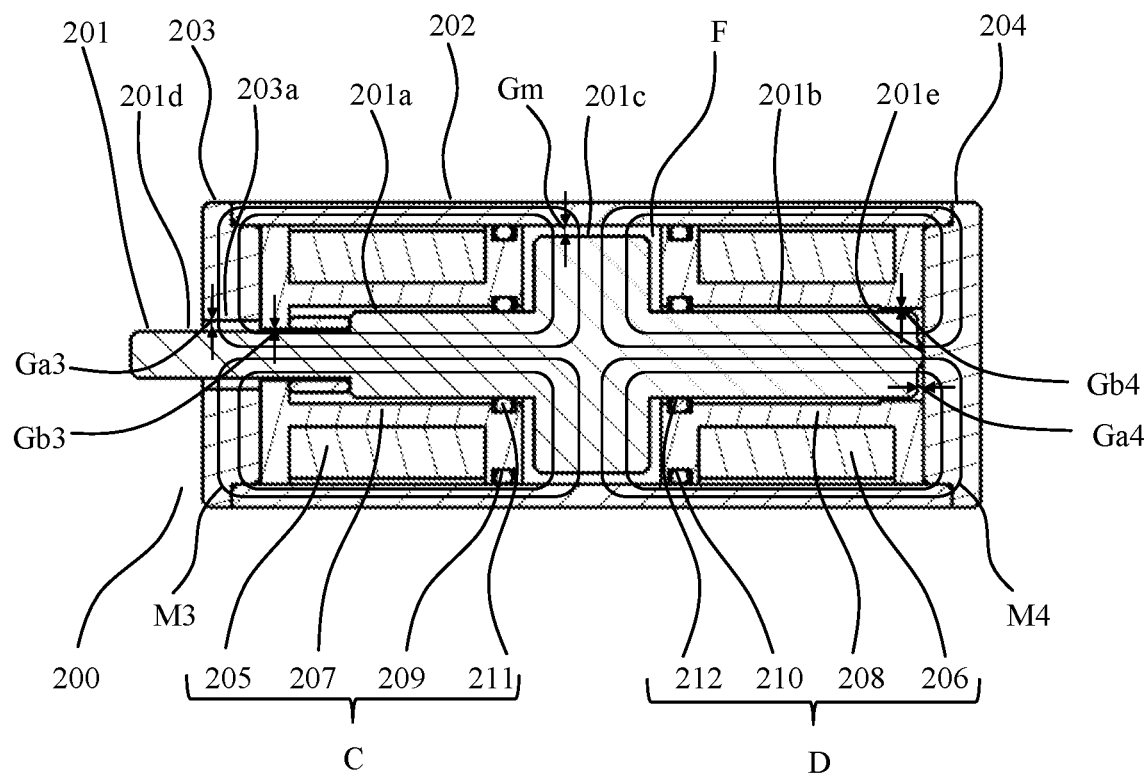
FIG. 6 is a sectional view illustrating a magnetic circuit in the rotational resistance apparatus according to Example 2.

As illustrated in FIG. 6, a gap (first gap) Gb3 between an inner circumferential surface of a slide bearing 207c provided on the bobbin 207 and an outer circumferential surface of a transmission shaft part 201d, which is rotatably received by the slide bearing 207, of the shaft member 201 is narrow than a gap (second gap) Ga3 between an inner circumferential surface of a through hole part 203a of the first circular plate 203 and the outer circumferential surface of the transmission shaft part 201d. Additionally, a gap (first gap) Gb4 between an inner circumferential surface of a slide bearing 208c that is provided on the bobbin 208 and that rotatably receives the first shaft 201b and an outer circumferential surface of the first shaft 201b is narrow than a gap (second gap) Ga4 between an end surface of the first shaft 201b and the second circular plate 204 formed by the convex part 201e. Further, the gaps Gb3, Gb4 are narrow than a gap (third gap) GM between an outer circumferential surface of a second shaft 201c and an inner circumferential surface of the cylindrical member 202 in a space where the MR fluid F is arranged.

FIG. 6 illustrates a magnetic circuit in the rotational resistance apparatus 200 according to this example. In the rotational resistance apparatus 200, currents flow from a magnetic field control apparatus to coils 205, 206 so that magnetic fluxes in opposite directions flow in the first shafts 201a, 201b. FIG. 6 illustrates a first magnetic circuit M3 in which a magnetic flux generated by energizing the coil 205 flows and a second magnetic circuit M4 in which a magnetic flux generated by energizing the coil 206 flows using a closed loop curve.

The magnetic fluxes that flow from each of the first shafts 201a, 201b of the shaft member 201 to the second shaft 201c repels in the second shaft 201c and flow toward an outer circumferential surface of the second shaft 201c. The magnetic fluxes flowing out from the outer circumferential surface of the second shaft 201c pass through the MR fluid F and flow in the cylindrical member 202. The magnetic fluxes generated by energizing the coil 205 of the magnetic fluxes which flow in the cylindrical member 202 flow in part facing the coil 205 of the cylindrical member 202 and flow toward the first circular plate 203. Then, the magnetic fluxes flowing through the first circular plate 203 returns to the first shaft 201a through the transmission shaft part 201d, which faces the through hole part 203a in a non-contact manner. On the other hand, the magnetic fluxes generated by energizing the coil 206 of the magnetic fluxes which flow in the cylindrical member 202 flow in part facing the coil 206 of the cylindrical member 202 and flow toward the second circular plate 204. Then, the magnetic fluxes flowing through the second circular plate 204 returns to the first shaft 201b.

As described above, in this example, since almost all of the magnetic fluxes generated by energizing the coils 205, 206 flow in the MR fluid F through the first and second magnetic circuits M3, M4, rotation resistance torque against the shaft member 201 can be efficiently generated. Then, changing the amount of current flowing in the coils 205, 206 can control the strength of the magnetic fluxes flowing in the MR fluid F to adjust the magnitude of the rotation resistance torque.

In this example, since the gaps Gb3, Gb4 are narrower than the gaps Ga3, Gm, the first shaft 201a and the second shaft 201c of the shaft member 201 are respectively rotatably supported in a non-contact state with the circular plate 203 and the cylindrical member 202, and the gaps Ga3, Gm are kept constant. On the other hand, the first shaft 201b contacts the second circular plate 203 at the convex part 201e, but the gap Ga4 is kept constant by the convex part 201e and the biasing force of the coil spring 215. Keeping the gaps Ga3, Ga4, Gm constant can generate stable rotation resistance torque without making the magnetic resistance of the first and second magnetic circuits M3, M4 unstable and changing the magnetic fluxes flowing in the MR fluid F.

In this example, since the slide bearings 207c, 208c are formed integrally with the bobbins 207, 208, the configuration and the assembly can be simplified. Further, the gap (Ga3, Ga4, Gm) in each magnetic circuit can be reduced, and larger rotation resistance torque can be obtained by reducing the magnetic resistance of each magnetic circuit.

In addition, the shaft member 201 is biased by the coil spring 215 in this example but may be biased by another biasing member.

Example 3

Figure 7:
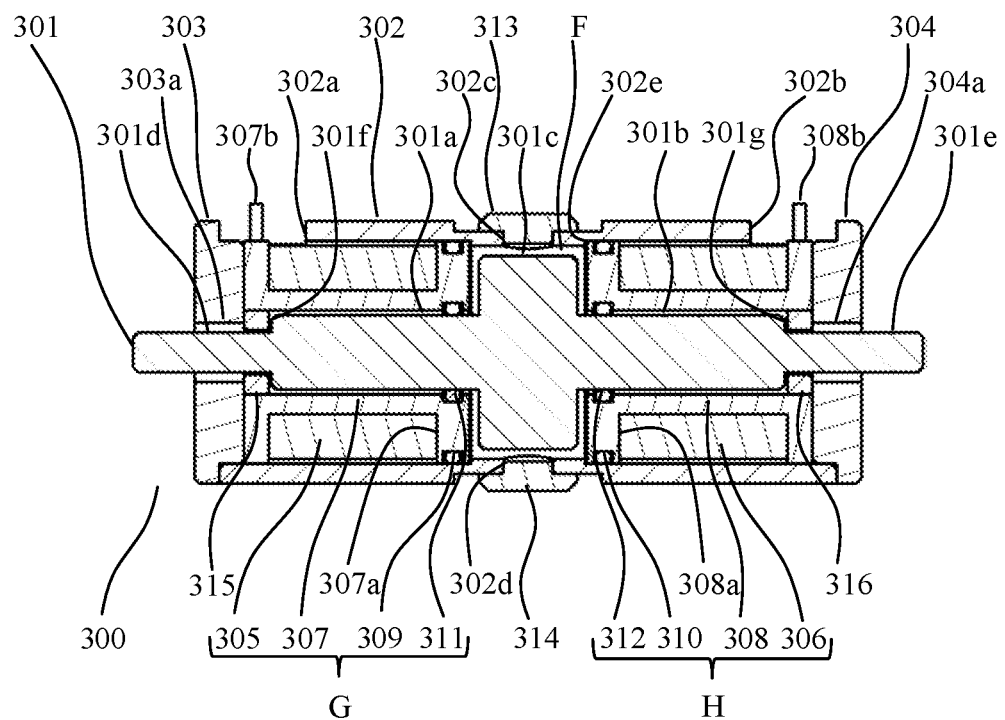
FIG. 7 is a sectional view illustrating a configuration of a rotational resistance apparatus according to Example 3 of the present invention.

FIG. 7 illustrates a configuration of a rotational resistance apparatus 300 according to Example 3 of the present invention. In this example, components common to or similar to those in Example 1 are given reference numerals with the first digit 1 of the reference numeral in Example 1 changed to 3, and the digits thereafter are the same. Further, coil units G, H respectively corresponds to the coil units A, B in Example 1. Below, differences from the rotational resistance apparatus 100 according to Example 1 are explained.

The slide bearings 107c, 108c are integrally provided to the bobbins 107, 108 in Example 1 but, in this example, slide bearings 315, 316, which are made of a non-magnetic material and are formed as a separate part from bobbins 307, 308, are fixed to inner circumferential surfaces of end surface parts 307a, 308a of the bobbins 307, 308. As the slide bearings 315, 316, a resin bearing made of a low friction material, and a metal bearing impregnated with lubricating oil can be used.

Figure 8:
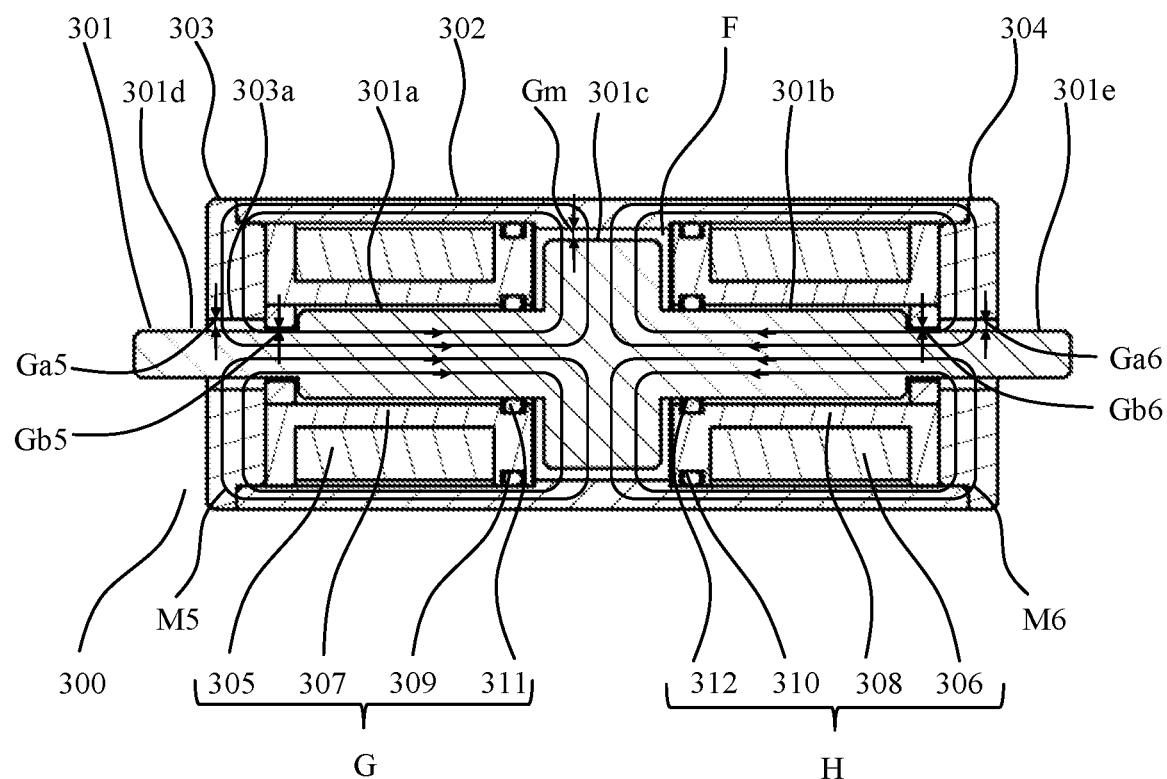
FIG. 8 is a sectional view illustrating a magnetic circuit in the rotational resistance apparatus according to Example 3.

In this example, as illustrated in FIG. 8, a gap (first gap) Gb5 between an inner circumferential surface of a slide bearing 315 and an outer circumferential surface of a transmission shaft part 301d, which is rotatably received by the slide bearing 315, of a shaft member 301 is narrow than a gap (second gap) Ga5 between an inner circumferential surface of a through hole part 303a of a first circular plate 303 and the outer circumferential surface of the transmission shaft part 301d. Additionally, a gap (first gap) Gb6 between an inner circumferential surface of a slide bearing 316 and an outer circumferential surface of a detection shaft part 301e, which is rotatably received by the slide bearing 316, of the shaft member 301 is narrow than a gap (second gap) Ga6 between an inner circumferential surface of a through hole part 304a of a second circular plate 304 and the outer circumferential surface of the detection shaft part 301e. Further, the gaps Gb5, Gb6 are narrow than a gap (third gap) GM between an outer circumferential surface of a second shaft 301c and an inner circumferential surface of the cylindrical member 302 in a space where the MR fluid F is arranged.

As illustrated in FIG. 8, first and second magnetic circuits M5, M6 in the rotational resistance apparatus 300 according to this example are respectively equivalent to the first and second magnetic circuits M1, M2 in Example 1. Thus, in this example, rotation resistance torque against the shaft member 301 can be efficiently generated. Further, in this example, since the gaps Gb5, Gb6 are narrower than the gaps Ga5, Ga6, Gm, the shaft member 301 is rotatably supported in a non-contact state with a case member (the cylindrical member 302, the first and second circular plates 303, 304). As a result, the gaps Ga5, Ga6, Gm are always kept constant, and stable rotation resistance torque can be generated.

Slide bearings receiving bearing members, which are corresponding to the slide bearings 315, 316 and are fixed to a shaft member, may be integrally provided on bobbins. In this case, the bearing members fixed to the shaft member 301 may be regarded as one body with the shaft member, and a gap between each bearing member and each slide bearing of the bobbin may be a first gap.

The rotation resistance apparatuses 100, 200, 300 according to Examples 1 to 3 described above are small in size and can efficiently generate rotation resistance torque.

Example 4

Figure 9:
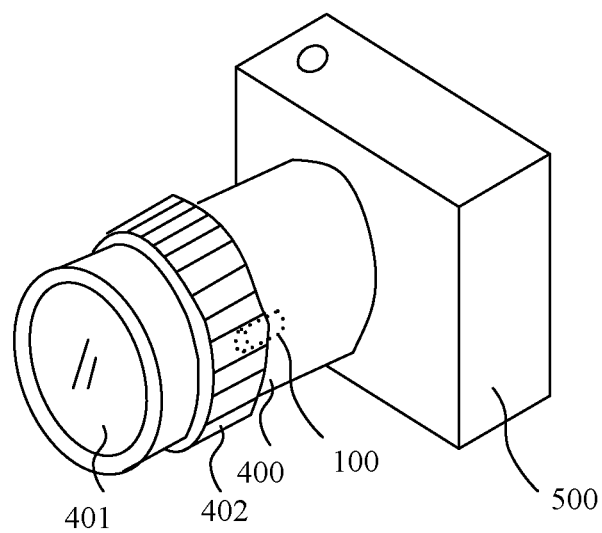
FIG. 9 is a perspective view illustrating an interchangeable lens according to Example 4 of the present invention.

FIG. 9 illustrates an interchangeable lens 400 as an operation apparatus according to Example 4 of the present invention. The interchangeable lens 400 is detachably attached to a camera 500 as an imaging apparatus.

An imaging optical system 401 is arranged in the interchangeable lens 400. An outer periphery of the interchangeable lens 400 is provided with an operation ring 402 as an operation member that allows a user to perform a rotational operation. When the operation ring 402 rotates, a variable power lens and a focus lens in the imaging optical system 401 move to an optical axis direction to perform zooming and focusing.

The rotation of the operation ring 402 is transmitted through the gear 115 to the shaft member 101 of the rotational resistance apparatus 100 according to Example 1 arranged in the interchangeable lens 400. As a result, the rotation resistance torque generated in the rotational resistance apparatus 100 by the rotational operation of the operation ring 402 is applied as an operational feeling. The rotational resistance apparatuses 200, 300 described in Examples 2, 3 may be used instead of the rotational resistance apparatus 100. Further, the rotation resistance apparatus described in Examples 1 to 3 may be used in operation apparatuses other than the interchangeable lens.

According to the above-mentioned example, for example, it is possible to provide to a rotational resistance apparatus advantageous in generation efficiency of rotation resistance and small size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-176362, filed on Sep. 27, 2019 which is hereby incorporated by reference herein in its entirety.

What is claimed is:

1. A rotational resistance apparatus comprising:
   a shaft member that includes a first shaft and a second shaft having a diameter larger than a diameter of the first shaft and that has magnetism;
   a bobbin that is arranged on an outer periphery of the first shaft and that does not have magnetism;
   a coil that is wound around the bobbin;
   a case member having magnetism that covers the bobbin, the coil, and the second shaft;
   a slide bearing that rotatably receives the first shaft through a first gap and that does not have magnetism; and
   a magnetic viscous fluid that is arranged between the second shaft and the case member,
   wherein the first gap is smaller than a second gap between the case member and the first shaft.

2. The rotational resistance apparatus according to claim 1, wherein the first gap is smaller than a third gap between the second shaft and the case member in a space where the magnetic viscous fluid is arranged.

3. The rotational resistance apparatus according to claim 1,
   wherein the case member has a through hole through which the first shaft passes, and
   wherein the second gap is provided between an inner circumferential surface of the through hole and an outer circumferential surface of the first shaft.

4. The rotational resistance apparatus according to claim 1,
   wherein a convex part is provided on one of an end surface of the first shaft in a shaft direction of the first shaft and the case member so as to abut on the other of the end surface and the case member, and
   wherein the second gap is provided between the end surface and the case member and around the convex part.

5. The rotational resistance apparatus according to claim 1, wherein the slide bearing is formed integrally with the bobbin.

6. The rotational resistance apparatus according to claim 1, wherein the first shafts and the coils are provided on both sides of the second shaft in a shaft direction of the shaft member.

7. The rotational resistance apparatus according to claim 6, wherein, by energizing the coils provided on the both sides so that magnetic fluxes in opposite directions to each other are generated in the first shafts provided on the both sides, a first magnetic circuit is formed through one first shaft, the second shaft, and the case member, and a second magnetic circuit is formed through the other first shaft, the second shaft, and the case member.

8. The rotational resistance apparatus according to claim 1, further comprising:
   a first sealing member that seals a gap between an outer circumferential surface of the bobbin and an inner circumferential surface of the case member; and
   a second sealing member that seals a gap between an inner circumferential surface of the bobbin and an outer circumferential surface of the first shaft.

9. An operation apparatus comprising:
   an operation member that is rotatable; and
   a rotational resistance apparatus that applies resistance force to the operation member,
   wherein the rotational resistance apparatus includes:
      a shaft member that includes a first shaft and a second shaft having a diameter larger than a diameter of the first shaft and that has magnetism;
      a bobbin that is arranged on an outer periphery of the first shaft and that does not have magnetism;
      a coil that is wound around the bobbin;
      a case member having magnetism that covers the bobbin, the coil, and the second shaft;
      a slide bearing that rotatably receives the first shaft through a first gap and that does not have magnetism; and
      a magnetic viscous fluid that is arranged between the second shaft and the case member,
   wherein the first gap is smaller than a second gap between the case member and the first shaft.

* * * * *